(12) United States Patent
Apicella et al.

(10) Patent No.: US 8,324,537 B2
(45) Date of Patent: Dec. 4, 2012

(54) TEMPERATURE AND HUMIDITY-CONTROLLED COMPOSITE MATERIAL ARTICLE, AND METHODS FOR USING SUCH AN ARTICLE

(75) Inventors: Alfonso Apicella, Cava de'Tirreni (IT); Michele Iannone, Torre Annunziata (IT); Generoso Iannuzzo, Avellino (IT); Giovanni Sagnella, Benevento (IT)

(73) Assignee: Alenia Aeronautica S.p.A., Pomigliano d'Arco, Naples (IT)

(*) Notice: Subject to any disclaimer, the term of this patent is extended or adjusted under 35 U.S.C. 154(b) by 543 days.

(21) Appl. No.: 12/530,405

(22) PCT Filed: Aug. 31, 2007

(86) PCT No.: PCT/IT2007/000599
§ 371 (c)(1), (2), (4) Date: Sep. 8, 2009

(87) PCT Pub. No.: WO2008/107922
PCT Pub. Date: Sep. 12, 2008

(65) Prior Publication Data
US 2010/0096383 A1 Apr. 22, 2010

(30) Foreign Application Priority Data
Mar. 8, 2007 (IT) .................. TO2007A0176

(51) Int. Cl.
*H05B 1/02* (2006.01)
*H05B 6/06* (2006.01)
*H05B 6/08* (2006.01)

(52) U.S. Cl. ......... 219/490; 219/494; 219/663; 219/667
(58) Field of Classification Search .............. 219/490, 219/492, 494, 496, 544, 546, 547, 549, 552–553, 219/633–634, 645, 663, 667; 73/335.13
See application file for complete search history.

(56) References Cited

U.S. PATENT DOCUMENTS

| 3,335,608 | A | * | 8/1967 | Alban et al. ............ 73/335.13 |
| 4,888,472 | A | * | 12/1989 | Stitz ....................... 219/544 |
| 5,126,000 | A | * | 6/1992 | Takai et al. ............. 219/549 |
| 5,340,428 | A | * | 8/1994 | Kodokian ............... 219/634 |

(Continued)

FOREIGN PATENT DOCUMENTS
DE 10 2004 042 423 A1 3/2006
(Continued)

OTHER PUBLICATIONS

Rouchon, J. "Certification of large Airplane Composite Structures, Recent Progress and New Trends in Compliance Philosphy", 17th ICAS Congress, Stockhom, Sweden, 1990, pp. 1-9.

*Primary Examiner* — Trong Phan
(74) *Attorney, Agent, or Firm* — Merchant & Gould P.C.

(57) ABSTRACT

An article of composite material includes a plurality of plies of material consolidated through the application of pressure and heating, in which each material ply is made by a resin matrix reinforced with fiber material. The article includes heating electrical resistance and temperature sensing devices embedded in the composite material, which are respectively placed in at least one interface zone between the material plies and are suitable to allow a temperature control of the article in service.

14 Claims, 5 Drawing Sheets

U.S. PATENT DOCUMENTS

| | | | | |
|---|---|---|---|---|
| 5,705,796 A | * | 1/1998 | Hansen et al. | 219/633 |
| 5,756,973 A | * | 5/1998 | Kirkwood et al. | 219/634 |
| 5,760,379 A | * | 6/1998 | Matsen et al. | 219/633 |
| 6,323,468 B1 | * | 11/2001 | Dabelstein et al. | 219/633 |
| 7,126,096 B1 | * | 10/2006 | Matsen et al. | 219/633 |

FOREIGN PATENT DOCUMENTS

| | | |
|---|---|---|
| EP | 0 362 662 | 4/1990 |
| WO | WO 91/11891 | 8/1991 |
| WO | WO 2007/135383 A1 | 11/2007 |

* cited by examiner

TEMPERATURE AND HUMIDITY-CONTROLLED COMPOSITE MATERIAL ARTICLE, AND METHODS FOR USING SUCH AN ARTICLE

This application is a National Stage Application of PCT/IT2007/000599, filed 31 Aug. 2007, which claims benefit of Serial No. To2007A000176, filed 8 Mar. 2007 in Italy and which applications are incorporated herein by reference. To the extent appropriate, a claim of priority is made to each of the above disclosed applications.

As is known, polymeric materials have a macromolecular structure, i.e. made by long polymeric chains having a relative mobility which varies depending on the structure, but which in all cases allows the access of molecules of substances with lower molecular weight, which penetrate between macromolecules forming thereby a real solution.

Of course the amount of these substances depends on the molecular nature of both the polymer and the low molecular weight substance. The interaction can also be chemical and/or physical.

Chemical interaction, for some more chemically aggressive substances, like acids and/or some organic solvents, can induce a modification of the polymer, and sometimes also the polymer dissolution. Physical interaction is instead related to a generally reversible mixing; it creates a solution between polymer and the low molecular weight substance, with physical characteristics different from the ones of the pure polymer. As low molecular weight substances, they generally improves the relative mobility among macromolecules, generally inducing a decrease in the glass transition temperature ($T_g$); by a mechanical point of view the yield stresses $\sigma_y$ (tensile yield stress) and $\tau_y$, (shear yield stress) are generally decreased, and generally also the elastic modulus E (tensile elastic modulus, or Young modulus) and the shear elastic modulus (G) are decreased. All these effects seen as a whole are generally defined "plasticization effect".

Plasticization depends on polymer nature as well as on the nature and amount of the low molecular weight substance.

Among the substances which induce plasticization are the organic solvents (e.g.: MEK, methylic alcohol, ethylic alcohol, hexane, acetone), and also water. When the polymer is immersed in the plasticizing liquid, it tends to absorb such liquid, and absorbs some amount thereof, with a rate depending on the diffusion coefficient of the plasticizer in the polymer. When an equilibrium status is reached, so as that there is not any further absorption of plasticizer in the polymer (actually, on a molecular level the number of entering molecules is equivalent to that of exiting molecules), it is said that the "saturation" content of plasticizer has been reached, which depends on the chemical nature of both polymer and plasticizer, and can vary with the temperature.

When the polymer is immersed in an environment where the plasticizer is partially present, the saturation amount depends on the plasticizer percentage present in the surroundings; more specifically, in thermodynamic terms we talk about plasticizer activity. In case of gas mixtures the activity depends on partial pressure; if x is the plasticizer volume fraction, the partial pressure is $x \cdot \pi$, where $\pi$ is the mixture overall pressure. When water is dispersed in air in gaseous state, and an equilibrium is established between the gaseous water and liquid water, the activity of gaseous water is equivalent to the one of liquid water. In this case the environment is defined as water saturated, the relative humidity is 100% and the water partial pressure in gaseous state is equivalent to the water vapour pressure of the liquid water at the same temperature.

In case of polymers exposed in an environment containing some water, an approximate linear law correlates the relative humidity and the water percentage absorbed by the polymer when saturation is reached.

On the contrary, as for the variability of water absorbed as a function of temperature, generally, the dependence on temperature is not very high; for the epoxy resins utilized as composite matrix for the aeronautical structural applications the saturation water content absorbed by resin in liquid water (or, equivalently, in air environment with 100% humidity) changes with the resin formulation about from 1 to 3%, and is almost constant with equal resins in the temperature range from 25° to 80° C.

The time needed to reach the saturation in the different environments is instead controlled by the diffusion of the water within the polymer, and consequently depends on the diffusion coefficient, which depends with an exponential law on the temperature. The integration of the diffusion law allows to find a quadratic correlation between the saturation time and the part thickness.

On the basis of the previous considerations we can state that polymeric materials, including for example the matrices of the polymeric matrix composites, are exposed to absorb water in time from the atmospheric environment, in a manner depending on the service environmental conditions. Due to the extreme variability of the environmental conditions, the most unfavourable ones must be precautionarily considered for design, which for aeronautical applications have been agreed as being 28° C. e 85% relative humidity for the whole aircraft service life (typically 30 years). Consequently for most of the composite structures a saturation at 85% must be considered for the certification.

By the point of view of temperatures, generally the minimum one (max cruise height) is −55° C., the maximum one (on ground, max sun light exposure) is 80° C.

Due to what mentioned about plasticization, the effect of high temperature acts in the same direction as water absorption; consequently the material and structure certification is made by evaluating the material at high temperature and after water absorption ("hot wet" condition), and at low temperature generally without water absorption ("cold dry" condition).

The requirement to consider also these conditions in the aeronautical certification programs—which are already very demanding in terms of mechanical tests at ambient temperature (in any case they relate to coupons, details, elements, subcomponents and full scale components)—is very expensive in terms of additional test activity (also because of the exposure of the test samples) and time. In fact, due to the above, the absorption is very slow, and simulating an absorption during a period of 30 years at room temperature requires several months also when accelerated aging is used conditions (at high temperature).

Therefore, the aim of the present invention is to provide an article made of composite material having the capability to overcome the above problems induced by the humidity effects on the polymeric materials.

Due to the fact that in the composite material article heating and temperature sensing means are integrated, there is the possibility to control in a permanent and finalised way the article service conditions. The resulting benefits depend on sizing the structures without taking in account the knock down of material properties induced by high level of absorbed water and low temperature. That specifically implies:

the permission to use higher design allowables, which do not take in account the knock down induced by humidity and eventually by the low temperature, consequently performing lighter structures;

the permission to certify the structures without performing wet tests, at level of coupons, elements, subcomponents and components.

Further subject of the invention are use methods of the article according to the invention, and a computer program product loadable into the memory of a computer and including software code portions of implementing such methods when the program is run on the computer, and systems for controlling the service conditions of the article according to the invention.

In the following some preferred, not limitative embodiments of the invention are outlined, with reference to the attached drawings, where.

According to the invention, panel 1 includes heating means 20 and temperature sensing means 30 embedded in the composite material, which are respectively arranged in at least one interface zone 11,13 between the pies 10 and are suitable to allow in service a temperature control within panel 1.

The heating means 20 are suitable to be connected in service with control means 40, for activating the heating means in order to increase the part temperature above the ambient level, thereby inducing an effect of humidity loss or also controlling the material minimum service temperature. Preferably, the heating means 20 are local resistances made of copper wires embedded in the composite material, placed at the interface 11 in the middle of the composite article 1. In this case, the control means 40 include a current or tension generator.

Figure 1:
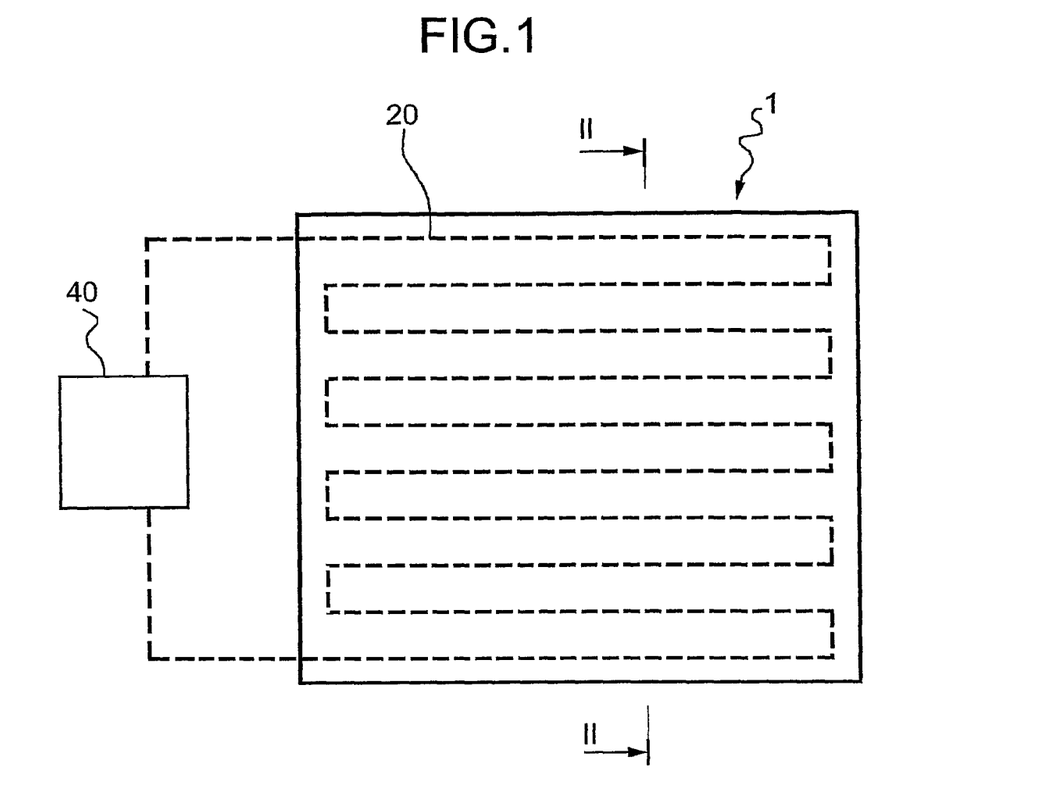
FIG. 1 is a schematic representation of the top view of a composite material panel according to the invention, showing some characteristics of the panel.
Figure 2:
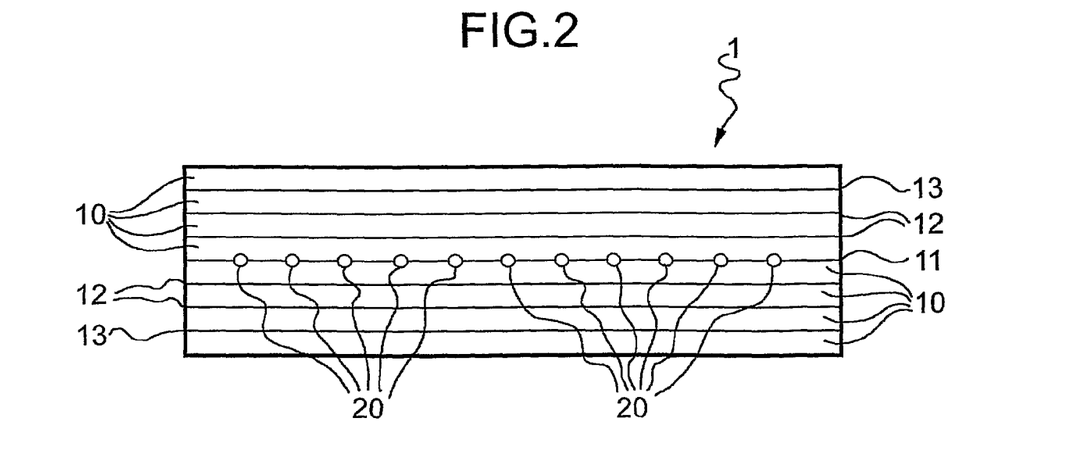
FIG. 2 is a schematic representation of a section of the panel in FIG. 1, in correspondence of II-II.

An example of positioning a 10 meters long resistance 20 in a 1 m×1 m composite panel is shown in the top view in FIG. 1. In this example, the resistance extends in a meanderwise manner along the interface zone 11 between the central plies 10.

The power required by the electrical resistance can be calculated on the basis of the following considerations.

The controlled heating of the article at a temperature above the ambient temperature can allow a drying effect. In fact, in an equilibrium condition between the flow of the plasticizer (water) leaving and entering the article at a temperature above the ambient one, vapour pressure of the water at the polymer temperature $T_p$ (i.e. the composite matrix temperature) is equivalent to the partial pressure of water $p_w$, which is the product between the water vapour pressure at ambient temperature $T_a$ and the ambient relative humidity R.H.

In the following table 1 a summary table is reported, showing that a light heating induces a significant decrease of the polymer water content at equilibrium conditions.

TABLE 1

| T, °C. | Water Vapour Pressure, mmHg | Water Vapour Pressure, atm | Air Temp., °C. | Polymer Temp., °C. | Relative Saturation Ratio | Polymer Temp., °C. | Relative Saturation Ratio | Polymer Temp., °C. | Relative Saturation Ratio | Polymer Temp., °C. | Relative Saturation Ratio |
|---|---|---|---|---|---|---|---|---|---|---|---|
| 10 | 9.209 | 0.0121 | 10 | 10 | 1 | 20 | 0.525178 | 30 | 0.289373 | 40 | 0.166456 |
| 15 | 12.788 | 0.0168 | 15 | 15 | 1 | 25 | 0.538306 | 35 | 0.303213 | 45 | 0.177908 |
| 20 | 17.535 | 0.0231 | 20 | 20 | 1 | 30 | 0.550999 | 40 | 0.316951 | 50 | 0.189547 |
| 25 | 23.756 | 0.0313 | 25 | 25 | 1 | 35 | 0.563272 | 45 | 0.330495 | 55 | 0.201254 |
| 30 | 31.824 | 0.0419 | 30 | 30 | 1 | 40 | 0.57523 | 50 | 0.344006 | 60 | 0.213041 |
| 35 | 42.175 | 0.0555 | 35 | 35 | 1 | 45 | 0.586742 | 55 | 0.357294 | 65 | 0.224885 |
| 40 | 55.324 | 0.0728 | 40 | 40 | 1 | 50 | 0.598033 | 60 | 0.370357 | 70 | 0.236731 |
| 45 | 71.88 | 0.0946 | 45 | 45 | 1 | 55 | 0.608946 | 65 | 0.383278 | 75 | 0.248634 |
| 50 | 92.51 | 0.1217 | 50 | 50 | 1 | 60 | 0.619293 | 70 | 0.395849 | 80 | 0.260518 |
| 55 | 118.04 | 0.1553 | 55 | 55 | 1 | 65 | 0.629412 | 75 | | 85 | |
| 60 | 149.38 | 0.1966 | 60 | 60 | 1 | 70 | 0.639196 | 80 | | 90 | |
| 65 | 187.54 | 0.2468 | 65 | 65 | 1 | 75 | | 85 | | 95 | |
| 70 | 233.7 | 0.3075 | 70 | 70 | 1 | 80 | | 90 | | 100 | |
| 75 | 289.1 | 0.3804 | 75 | 75 | 1 | 85 | | 95 | | 105 | |
| 80 | 355.1 | 0.4672 | 80 | 80 | 1 | 90 | | 100 | | | |
| 90 | 525.76 | 0.6918 | 90 | 90 | 1 | 100 | | | | | |
| 100 | 760 | 1.0000 | 100 | 100 | 1 | | | | | | |

In the figures an article 1 is represented, made of composite material according to the invention, in particular a panel, supposed to be installed on an aircraft. That panel 1 includes, in a per se known way, a plurality of plies of material 10 consolidated by means of pressure and heat, in which each ply of material 10 is formed by a resin matrix reinforced with fibre material. The polymeric matrix can be thermoplastic or thermosetting, and is reinforced by fibres, in particular long fibres, e.g. carbon or glass or Kevlar. Interfaces zones 11, 12, 13 are defined between the materials plies 10.

The relative saturation ratio, defined as:

(water content/referred to saturation/(ambient R.H.), is equal to the ratio:

(vapour pressure of water at ambient temperature)/(vapour pressure of water at the polymer temperature).

E.g., for an air temperature of 20° C., the relative saturation ratio when the polymer heating is of 20° C. (polymer at 40° C., ambient at 20° C.) is 0.32, and for a polymer heating of 30° C. (polymer at 50° C., ambient at 20° C.) is 0.19.

That means that if, for example, the ambient relative humidity is R.H.=85%, at the equilibrium with a polymer heating of 20° C. the saturation percentage of the polymer $x_p$ is 0.32*0.85*100=27% of the saturation value, whereas at the equilibrium when the polymer heating is 30° C. the percentage $x_p$ is 0.19*0.85*100=16% of the saturation value. E.g., if the weight gain of a dry composite due to water absorption in a 100% R.H. ambient is for example 2%, the equilibrium weight gain at 85% R.H. would normally be 1.7%, but would be only 0.32% if the composite heating were 30° C.

Always in stationary conditions, the thermal power needed to maintain a temperature difference between the polymer and the environment, depends on the heat exchange with environment by convection. Thus, if h is the convection exchange coefficient and S is the exchange surface between the part into consideration and the environment, the thermal power needed to obtain a temperature difference ΔT is W=h·S·ΔT.

For a vertical panel in air which exchanges heat by only natural convection a simplified dimensionless equation is reported in literature (Perry—Chemical Engineers' Handbook—Mc Graw-Hill) which allows to calculate the coefficient h for different values of the dimensionless Grashof (Gr) and Prandtl (Pr) numbers:

$$h=b(\Delta T)^m L^{3m-1}$$

where the values of b and m are reported for different conditions in the following table 2.

TABLE 2

| Y = Gr Pr | m | b (air) |
|---|---|---|
| $10^4 < Y < 10^9$ | ¼ | 0.28 |
| $Y > 10^9$ | ⅓ | 0.18 | and the dimensions are:
h=(BTU)/(hr)(sqft)(° F.)
L=ft
ΔT=° F.

On the basis of these data, considering a flat composite panel of 1×1 m (thus 2 sqm of exposed surface), in a vertical position, in air, which exchanges heat by natural convection, the needed power to maintain a temperature difference ΔT between the panel and the external environment, which varies with the different values of dimensionless numbers, for ΔT=20° C. is 115-135 W; for ΔT=30° C. is 192-231 W; for ΔT=40° C. is 275-340 W.

If the heating is obtained through an electrical resistance, it is controlled by the Ohm's Law, and the following equations have to be considered:

$$\Delta V = R*I \quad (1)$$

$$W=\Delta V*I=R*I^2=(\Delta V)^2/R \quad (2)$$

$$R=L\rho/S \quad (3)$$

Thus $$W=(\Delta V)^2 *S/L*\rho \quad (4)$$

and from equation (4) it is shown that the power W, for a fixed tension ΔV, depends linearly on the surface of the resistance section S and is inverse linear function of its length L.

Using a copper resistor (copper electrical resistivity is ρ=0.0000000168 ohm·m), the calculation is shown for two cases (the minimum and maximum required power, 115 and 340 W) previously reported.

Considering a copper resistor with section S=0.025 mm², length L=10 m, the power generated for a tension ΔV=8.8 V is 115 W, for a tension of 15.1 V is 340 W.

As previously stated, sensing means 30 are positioned in the composite for temperature measurement, placed in different depths of the thickness (preferentially in the interfaces zones 13 close to the two external surfaces of panel 1 and in the interface zone 11 of the central zone) in positions adequately spaced of the surface. Preferentially, sensing means 50 for humidity detection are also inserted, positioned in a way similar to the temperature sensors 30. The thermal sensors 30 are preferentially thermocouples, whereas humidity sensors 50 are based on the property variation of the sensor material when humidity changes (typically the material is a hygroscopic polymeric material changing its diffraction index).

Figure 3:
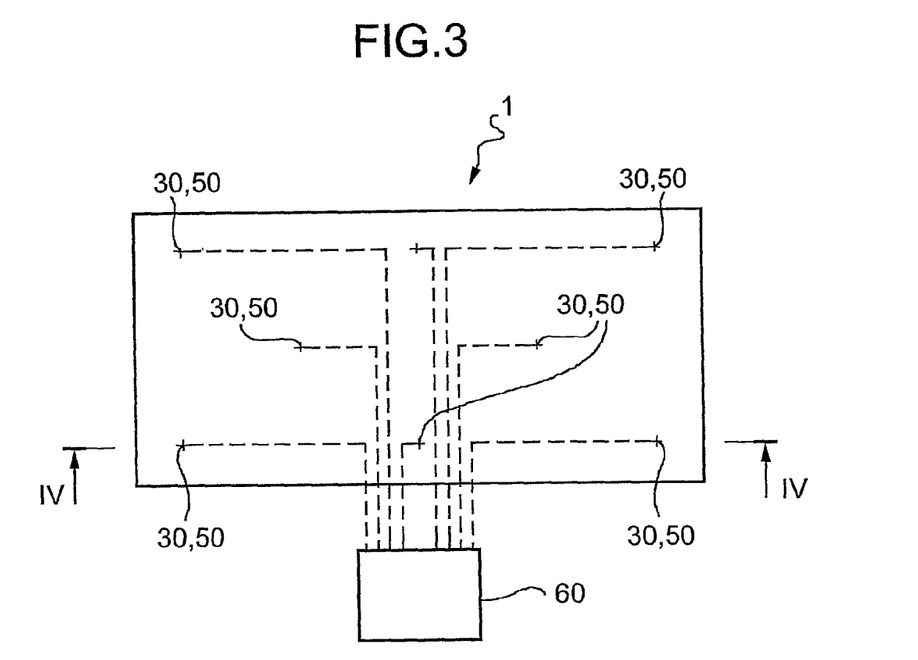
FIG. 3 is an additional schematic representation of the top view of the panel in FIG. 1, showing other characteristics.
Figure 4:
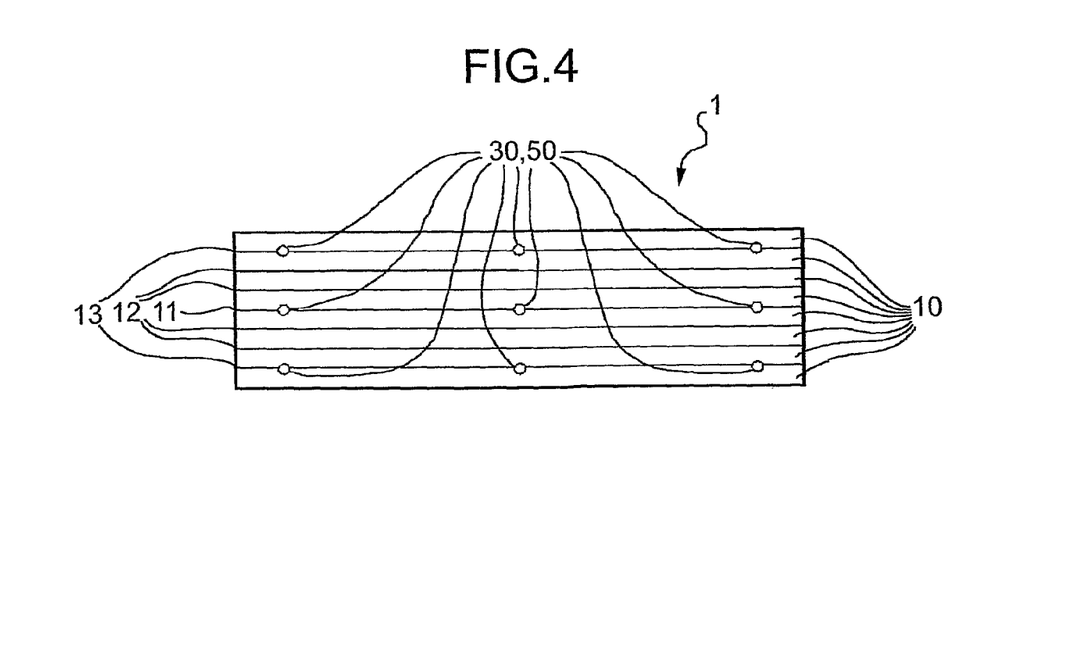
FIG. 4 is a schematic representation of a section of the panel in FIG. 3, in correspondence of IV-IV.

In the FIGS. 3 and 4 an example is shown of sensor positioning scheme, basically suitable both for humidity sensors 50, and thermal sensors 30.

When panel 1 is installed aboard an aircraft (not shown), sensors 30, 50 are operatively connected with a control unit 60, which receives the measurement data which they provide and elaborates them following a specific algorithm. The control unit 60 is in turn operatively connected with the tension generator 40 to control the heating of panel 1 on the basis of the measurement data provided by sensors 30 and 50.

The fabrication process of an article according to the invention is substantially the one typical of a part produced by prepregs, based on prepreg stacking with geometry and orientation prescribed by the fabrication drawing. For illustrative purposes, an example is given in the following of the fabrication process of a panel made by prepreg plies with thermoset resin reinforced with long fibres. The first ply is thus laid down directly on the tool, adequately treated with a release agent to prevent the bonding of the composite on the tool. Then the other plies are laid up, utilising their tackiness. After completion, the lay up is closed with a bag (utilising also suitable auxiliary materials) and is processed under a defined temperature and pressure cycle.

Figure 5:
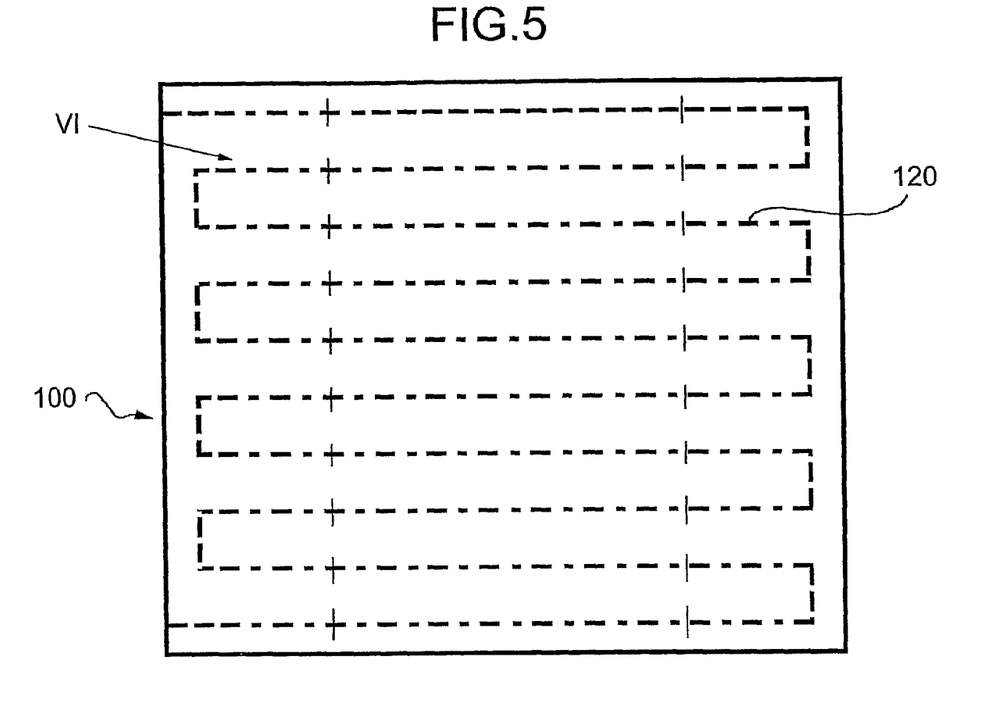
FIG. 5 is a schematic representation of the top view of a positioning tool to be used in a lay-up process of the panel of FIG. 1.
Figure 6:
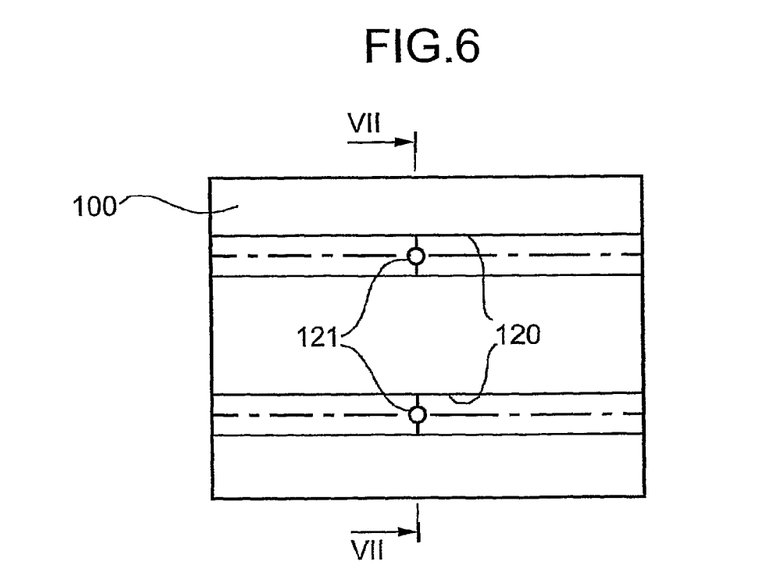
FIG. 6 is a representation of a magnified view of a part of the tool of FIG. 5 pointed by arrow VI in such figure.
Figure 7:
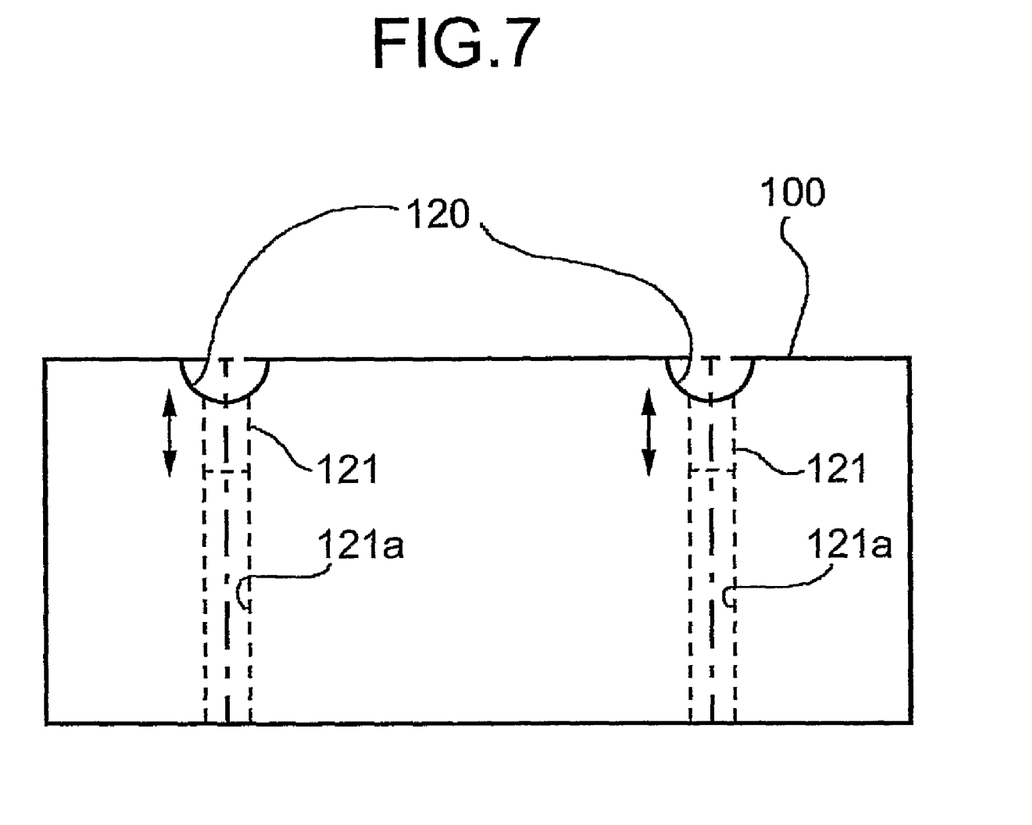
FIG. 7 is a schematic representation of a section of the part of FIG. 6, in correspondence of VII-VII.

The only difference between the panel object of the invention and a panel obtained by a standard process is that in the former the placement of resistances and/or sensors, to be placed between the n-th and (n+1)-th ply adjacent thereto, is performed after the positioning of the n-th ply and before the positioning of the (n+1)-th ply. For a correct positioning of the resistances and/or the sensors a suitable positioning tool 100 can be used, shown in FIG. 5 to 7, in which housings 120 for resistances and/or sensors are formed corresponding to the respective positions which are desired to be given to the resistances and/or sensors in the composite part. The said tool 100 is positioned by turning it upside-down and placing it on the ply on which resistances and/or sensors are supposed to be put, and then is removed, while leaving on the ply the needed resistances and/or sensors. For instance, for resistance shown in FIG. 1, the positioning tool has a groove 120 with meanderwise geometry equivalent to the resistance geometry, and slightly wider cross section than the resistance cross section. In order to prevent any de-moulding problems some extraction pins 121 can be included, sliding in guides 121a crossing the groove 120.

Some embodiment of a method for using a composite material article according to the invention are described in the following.

A first embodiment of the method provides that the article 1 of composite material is mounted onboard an aircraft in such a way as to have the heating means 20 and at least the temperature sensing means 30 connected to control means 40, 50 disposed onboard the aircraft. Alternatively, it is possible to conceive that the control means are installed on the ground, and that the heating means and temperature sensing means are connectable to the control means during a stop of the aircraft.

The simple design and manufacture of a composite with self heating capability is already sufficient to allow a good humidity control, when periodical heating cycles are provided by activating the heating means 20. In this case, calculating these cycles on the basis of the knowledge of water diffusion law and the service environmental conditions, it is possible to exploit the invention benefits even without the use of the humidity sensors. The thermal sensors are needed anyway, to adequately control the temperature increase in order to obtain the required effect of humidity reduction.

As an example, the calculation performed with a software developed in house by the Applicant, using an algorithm based on the diffusion Fick's law (mono-dimensional case), is reported in the following:

$$\Phi = -D * \delta c / \delta x$$

Typically the diffusion coefficient D changes with the temperature following the Arrhenius' law:

$$D = D_0 * \exp(-Ea/RT)$$

where T is the temperature in ° K., Ea is the activation energy and R is the gas universal constant.

The following examples show the calculation of the percent water content as a function of time of a panel submitted to periodic in-service absorption cycles, alternated with heating periods which induce desorption, with the result that the absorbed humidity is kept below a fixed threshold, even in the worst conditions.

EXAMPLES

A composite panel of thickness th is considered, made of composite material whose water diffusion coefficient value is such that: at 28° C. it reaches a humidity content equal to 90% of the saturation humidity content after 10 years, or equivalently it reaches the same humidity content at 80° C. after one month, starting from a dry condition in both cases.

On the basis of such data the water diffusion coefficient in the material can be calculated for the specific case; however, for a generic composite the diffusivity coefficient level as temperature function can be obtained through absorption tests at different temperatures.

For the material and thickness considered, the analysed service condition is of constant environmental temperature T=28° C. and 85% relative humidity (this case is conventionally considered as the worst one for certification purposes), while providing periodical panel heating periods for the panel, with $\Delta T = 30°$ C., i.e. at 58° C. The heating induces a desorption effect; in fact, on the basis of the values reported in table 1, from the point of view of environment relative humidity the relative humidity of 85% appears at the heated panel for a value of 85%*0.19=16%.

Figure 8:
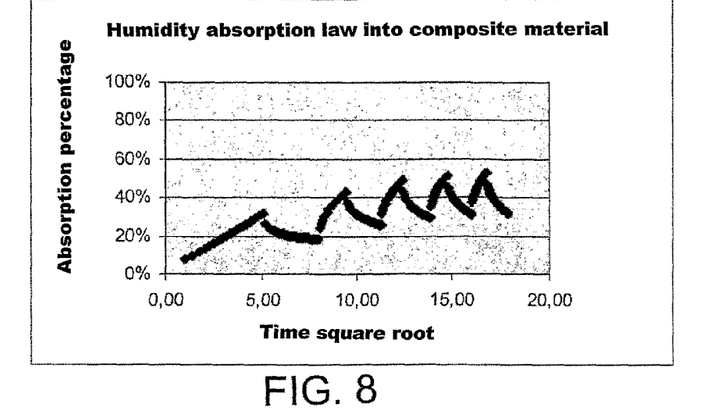
FIGS. 8 to 10 are graphs representing humidity absorption curves in composite material panels, according to the invention.
Figure 9:
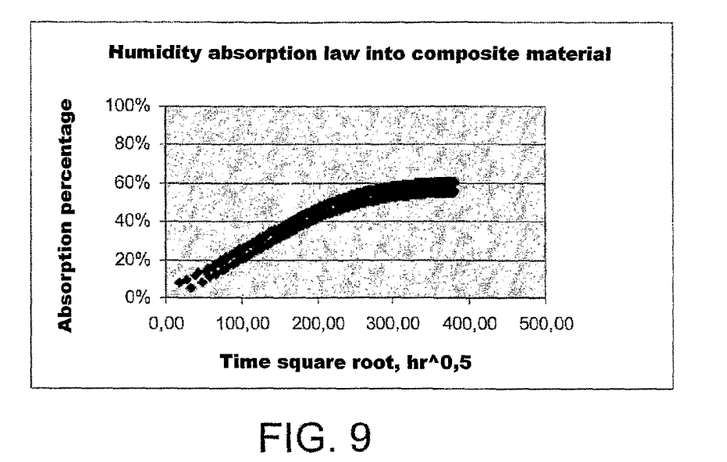
Figure 10:
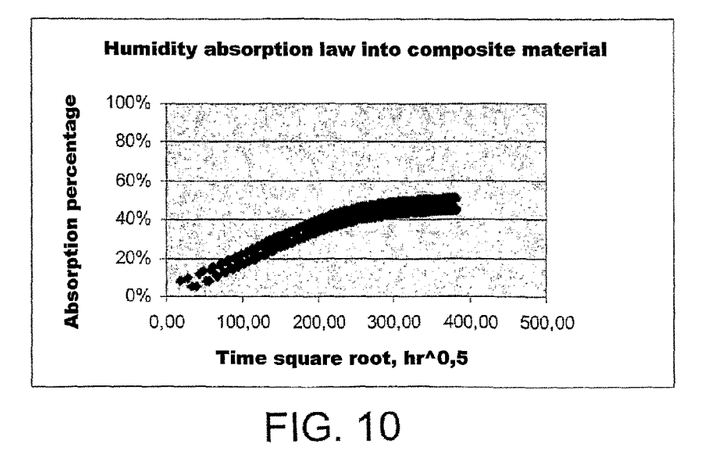

In FIGS. 8 to 10 humidity absorption curves (i.e., humidity absorption law into composite material) are shown which have been calculated for a panel in the above mentioned conditions.

FIG. 8 shows a graph plotting absorption percentage versus time square root. In FIG. 8 a typical progression of the humidity in a panel is shown for alternate periods of absorption/desorption, with long desorption periods.

FIG. 9 shows a graph plotting absorption percentage versus time square root, expressed in hr^0.5; a curve relating to 1 month service periods alternated with 12 hours of desorption periods is shown.

FIG. 10 shows a graph plotting absorption percentage versus time square root, expressed in hr^0.5; a curve relating to 1 month service periods alternated with 36 hours of desorption periods is shown.

It is possible to observe that the desorption period duration also affects the asymptotic value of the maximum absorbed humidity, which is kept below a fixed value only on the basis of a theoretical-numerical forecast and utilising suitable desorption periods without the use of humidity sensors.

As will be appreciated, the invention benefits consist of enabling the sizing of the structures without taking into account the knock down of the material properties due to low temperature and high humidity absorption, and that implies:

the opportunity to utilize higher design allowables, which are not affected by the knock down induced by the absorbed humidity, thereby obtaining lighter structures;

the opportunity to certify the structures without performing tests in wet conditions, neither at coupon level, nor at subcomponent and component level.

The use of temperature sensors allows a further ancillary advantage: according to a second embodiment of the procedure, heating is used to increase the minimum service temperature (typically for aeronautical applications is −55° C.) through the activation of the heating at low temperatures. For this goal a heating step by means of activation of the heating means 20 is envisaged when the service temperature of article 1, measured by the temperature sensing means 30, reaches a temperature below a fixed minimum level. Consequently it is possible to design the part for a temperature range having a higher minimum temperature, preventing the knock down of some properties induced by low temperatures, using higher design allowables and performing lighter structures. But in this case a stronger heat generation may be required, since in service there may be heat exchange conditions with high forced convection (high cruise speed), and this generation must be required in service. Instead the heating to produce drying can be scheduled on ground during the aircraft stop periods.

A third embodiment of the method includes the utilization of the humidity sensors 50 to activate the de-humidification when water content overcomes a fixed level.

The invention claimed is:

1. A method for controlling humidity absorption in an article installed on an aircraft, the article being made of composite material including a plurality of plies of material consolidated through application of pressure and heating, in which each ply of material is made by a resin matrix reinforced with fibre material, wherein the method comprises the following steps:

providing heating means and temperature sensing means embedded in the composite material, which are respectively placed in at least one interface zone between the material plies;

providing control means connected to the heating means and temperature sensing means; and activating the heating means to heat the article so as to induce a humidity loss, wherein the article is heated according to periodic heating cycles, wherein the heating cycles are programmed for keeping absorbed humidity below a fixed threshold, wherein absorbed humidity is calculated based on a diffusion law for the humidity within the composite material and based on data of environmental temperature and relative humidity, the data being determined with respect to operating conditions of the aircraft.

2. A method according to claim 1, wherein the article is in panel form, and the heating means are placed in a central interface zone of the panel.

3. A method according to claim 1, wherein the article is in panel form, and the temperature sensing means are placed in a central interface zone of the panel and in interface zones close to the external surfaces of the panel.

4. A method according to claim 1, wherein the heating means comprise at least one electrical resistor.

5. A method according to claim 4, wherein the electrical resistor includes a metallic wire extending along an interface zone between the material plies.

6. A method according to claim 1, wherein the temperature sensing means comprise at least one thermocouple-type sensor.

7. A method for controlling humidity absorption in an article installed on an aircraft, the article being made of composite material including a plurality of plies of material consolidated through application of pressure and heating, wherein each ply of material is made by a resin matrix reinforced with fibre material, wherein the method comprises the following steps:
   providing heating means and temperature sensing means embedded in the composite material, which are respectively placed in at least one interface zone between the material plies;
   providing humidity sensing means embedded in the composite material, which are placed in at least one interface zone between the material plies;
   providing control means installed on the aircraft and connected to the heating means, humidity sensing means and temperature sensing means; and
   activating the heating means to heat the article so as to induce a humidity loss, wherein the article is heated when a relative humidity in the article detected through the humidity sensing means reaches values above a maximum established threshold.

8. A method according to claim 7, wherein the article is in panel form, and the humidity sensing means are placed in a central interface zone of the panel and in interface zones close to external surfaces of the panel.

9. A method according to claim 7, wherein the humidity sensing means comprise at least one hygroscopic polymer-based sensor.

10. A method according to claim 7, wherein the article comprises a panel, and the heating means are placed in a central interface zone of the panel.

11. A method according to claim 7, wherein the article comprises a panel, and the temperature sensing means are placed in a central interface zone of the panel and in interface zones close to external surfaces of the panel.

12. A method according to claim 7, wherein the heating means comprise at least one electrical resistor.

13. A method according to claim 12, wherein the electrical resistor includes a metallic wire extending along an interface zone between the material plies.

14. A method according to claim 7, wherein the temperature sensing means comprise at least one thermocouple-type sensor.

* * * * *